United States Patent [19]

Ishigaki et al.

[11] Patent Number: 4,783,776
[45] Date of Patent: Nov. 8, 1988

[54] METHOD OF RECORDING AND REPRODUCING DIGITAL INFORMATION AND APPARATUS THEREFOR

[75] Inventors: Masaji Ishigaki; Hideo Onuki, both of Yokohama; Yukio Fukui, Machida; Masayuki Inoue; Kunikazu Ohnishi, both of Yokohama, all of Japan

[73] Assignee: Hitachi, Ltd., Tokyo, Japan

[21] Appl. No.: 886,413

[22] Filed: Jul. 17, 1986

[30] Foreign Application Priority Data

Jan. 22, 1986 [JP] Japan .................................. 61-9955

[51] Int. Cl.$^4$ ............................................ G11B 7/125
[52] U.S. Cl. .................................. 369/109; 369/121; 369/122; 369/102; 369/59; 369/44; 369/279; 346/76 L
[58] Field of Search ............... 369/109, 108, 121, 122, 369/111, 102, 47, 48, 59, 275, 44, 277, 278, 279; 346/76 L; 365/119; 372/20, 23

[56] References Cited

U.S. PATENT DOCUMENTS

| 3,795,902 | 3/1974 | Russell | 369/102 |
| 4,094,010 | 6/1978 | Pepperl | 365/215 |
| 4,094,013 | 6/1978 | Hill | 365/234 |
| 4,101,976 | 7/1978 | Castro | 365/119 |
| 4,363,116 | 12/1982 | Kleuters | 369/30 |
| 4,532,632 | 7/1985 | Yamoshita | 372/20 |
| 4,535,439 | 8/1985 | Satoh | 369/275 |
| 4,598,393 | 7/1986 | Pierce | 369/46 |

FOREIGN PATENT DOCUMENTS

| 164131 | 12/1985 | European Pat. Off. | 369/111 |
| 3545996 | 7/1986 | Fed. Rep. of Germany | 369/44 |

Primary Examiner—Alan Faber
Attorney, Agent, or Firm—Antonelli, Terry & Wands

[57] ABSTRACT

A digital information recording and reproducing method for significantly improving the transfer rate of digital information, comprises the steps of: forming a plurality of light beam guide tracks on a recording medium capable of multiple light-wavelength recording, the tracks being spaced apart by a predetermined pitch and each of the tracks comprising a series of pre-pits disposed in a scan direction and spaced apart by an interval longer than the diameter of a spot of a light beam for use in recording and reproducing; and recording and reproducing an information bit by changing the light beam to have a different wavelength predetermined n times in a predetermined order while the light beam is scanned by one interval of the pre-pits.

6 Claims, 8 Drawing Sheets

FIG. 2

→ SCAN DIRECTION A

1: PRE-PIT
2: LASER SPOT
6: PRE-PIT TRAIN

28: REFLECTING LAYER

FIG. 13

METHOD OF RECORDING AND REPRODUCING DIGITAL INFORMATION AND APPARATUS THEREFOR

BACKGROUND OF THE INVENTION

The present invention relates to a method and apparatus for optically recording and reproducing digital information.

A digital information recording medium (or optical recording medium) is known in the art which can record, reproduce or erase digital information signals by applying a laser light on a recording film formed on a substrate to heat the film locally and changing optical or magnetic properties of the recording film. With such an information recording medium, a recording density more than ten times as high as that of a magnetic recording medium can be attained.

The recording density of such an optical recording medium (the density is the number of bits per unit area to be recorded on the medium) is determined by the focussed spot diameter. The smaller the diameter is, the higher the recording density becomes. The laser beam spot diameter of an optical recording medium currently used for information recording and reproducing is about 1 micron which is almost its limit value considering short wavelengths of a laser beam and numerical apertures of an objective lens. Therefore, it cannot be expected for higher recording density.

To solve this problem, a multiple light-wavelength memory has been proposed using PHB (photochemical hole burning) phenomenon, as disclosed in the specification of U.S. Pat. No. 4,101,976. The PHB phenomenon is a kind of bleaching caused by wavelength-selective photochemical reactions of a material. Known such materials include phtalocyanine ($H_2PC$) dispersed polymethyl methacrylate (PMMA) and the like.

Figure 1:
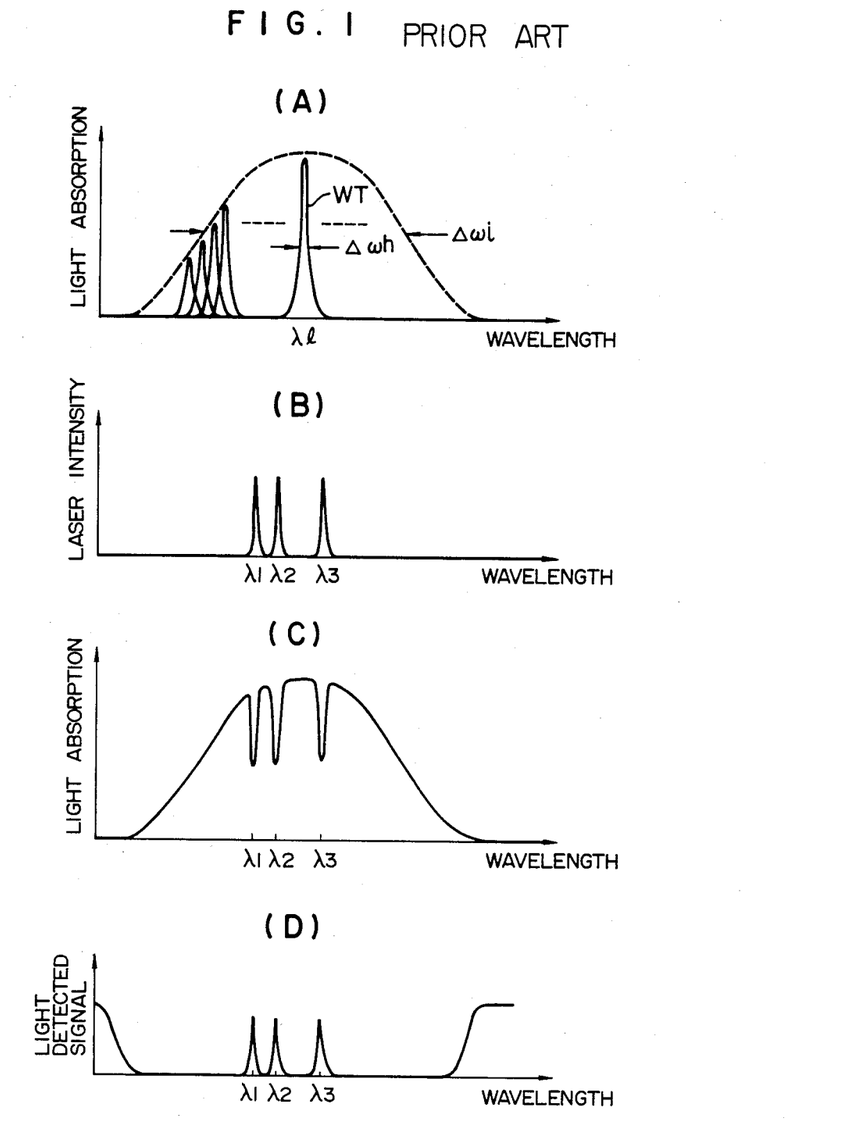
FIGS. 1(A)–(B) shows graphs for explaining the photochemical hole burning phenomenon.

The PHB phenomenon will be described briefly with reference to FIG. 1.

The spectral characteristic of light absorption and wavelength of such materials can be represented by an absorption band with a not-uniform width $\Delta\omega_i$ comprising a plurality of absorption bands WT with an uniform width $\Delta\omega_h$, as shown in FIG. 1(A). If such a material is exposed to laser lights having wavelengths $\lambda_1$, $\lambda_2$, and $\lambda_3$ each suitable for a certain absorption band WT having a wave-length $\lambda_l$, only those molecules having energy whose quantity is in the range of photon-energies at opposite side absorption bands WT of the laser beams each having a photon-energy of $h\nu_l = h_c/\lambda_l$, resonantly absorb light and become excited. These excited molecules are transformed into a light-induced substance having a different energy without affecting other molecules. As a result, as shown in FIG. 1(C) of the spectral characteristic, narrow optical holes appear respectively at wavelengths $\lambda_1$, $\lambda_2$, and $\lambda_3$, having a width equal to the width $\Delta\omega_h$ of the absorption band WT and a lifetime determined by the stability of the light-induced substance. The absorption power at the hole is smaller than at other positions and varies with the intensity of a laser beam. If a white light is applied to a thin film made of such a material, signals are detected as shown in FIG. 1(D) at the wave-lengths $\lambda_1$, $\lambda_2$ and $\lambda_3$ corresponding to a large transmissivity. Therefore, a monochrome light of wavelength $\lambda_1$ for example is scanned for reproduction, only the information having been recorded with a laser beam of wavelength $\lambda_1$ can be obtained.

The prior art disclosed in the above-mentioned U.S. Patent specification utilizes such phenomenon. According to this prior art, a laser beam of wavelength $\lambda_1$ is first used for recording information on the entire surface of an information recording medium. Next, a laser beam of wavelength $\lambda_1$ is used for recording. Similarly, recording information on the entire surface of the medium is performed switching the wavelength of a laser beam. Switching the wavelength of a laser beam is also performed in case of reproducing the information. Switching the wavelength during reproduction is accompanied with some problems in practical use. Since the transmissivity of a laser beam varies depending only on the absorption power of the absorption band WT concerned, if information on the thin film is to be reproduced using a laser beam of wavelength $\lambda_1$, only the information having been recorded with a laser beam of wavelength $\lambda_1$ is reproduced.

Therefore, recording areas for laser beams each having a wavelength of $\lambda_1$, $\lambda_2$, $\lambda_3$, and so on may be superposed so that information bits by laser beams may be superposed thereby enabling multiple recording.

According to the conventional multiple light-wavelength recording which records superposing information bits by varying the wavelength of a laser beam, the recording density of an information recording medium becomes a multiple of the recording density without superposing bits, by the number of wavelengths of a laser beam to be varied, thus enabling a high density recording. The quantity of the recording density multiplied by the area usable for recording on an information recording medium, i.e., the maximum information amount which can be recorded, is called a recording capacity.

Apart from the above, use of an information recording medium as an image file memory has recently been adopted in common and it has been desired to improve the quality of reproduced signals such as image signals. To this end, a broad bandwidth for reproduced signals is now under consideration. To realize a broad bandwidth, it is necessary to speed up a transfer rate, which is defined as the information amount which can be recorded or reproduced per unit time, or in other words the number of information signal samplings which can be conducted for recording or reproducing per unit time. The higher the transfer rate is, the broader the recording bandwidth of information signals can be made. This transfer rate is related to the spot diameter of a laser beam. That is, the smaller the laser beam spot diameter is, the smaller the area occupied by an information bit becomes. If information bits are sequentially placed close, the number of information bits to be recorded to reproduced by unit time increases. Thus, the number of information signal samplings for recording and reproducing increases to thereby make the transfer rate higher. In view of this, it can be said that the higher the recording density is, the higher the transfer rate becomes.

The prior art disclosed in the above-noted U.S. Patent specification realizes a high density recording using the PHB phenomenon. According to the prior art, the wavelength of a laser beam is changed for each recording on the entire surface of an information recording medium. Thus, it is intended that the time while information signals can be recorded is made longer by multi light-wavelength, or in other words it is intended that the apparent recording capacity of an information recording medium is made large.

The transfer rate according to the prior art is determined by the dimension of an information bit because the information bits, which are sequentially generated with a same wavelength laser beam, are disposed side by side without interposing upon another similarly to the conventional art. However, as previously described, the laser beam spot diameter is now at its limit value of about 1 micron so that the dimension of an information bit is also neat its limit value. Thus, improvement on the transfer rate cannot be expected.

SUMMARY OF THE INVENTION

It is an object of the present invention to solve the above-mentioned prior art problems and provide a method and apparatus for recording and reproducing digital information wherein the transfer rate is made higher through a higher recording density.

As the recording film of a digital information recording medium, a material permitting a multiple light-wavelength recording is used. A light beam guide track made of a series of pre-pits is prepared on the recording film on which information bits are recorded or reproduced by a recording/reproducing light beam. The series of pre-pits are respectively spaced apart by a distance or interval longer than the length of an information bit in the track direction.

The PHB phenomenon is used for recording on and reproducing from an information recording medium. The pre-pit on the recording film is used as a synchro mark. The wavelength of the recording/reproducing light beam is sequentially varied while scanning by one pitch between pre-pits, so that information bits associated with the recording/reproducing light beams of different wavelengths are formed interposing upon each other.

Each pre-pit is used as a basis of discriminating what wavelength of the recording/reproducing light beam was used for each information bit formed on the recording film. Therefore, information readout from each information bit during reproducing can always be performed using a correct wavelength of the recording/reproducing light beam. Information contents can be recorded which contents are obtained by further sampling information signals during a sampling period during which an information content between the adjacent bits recorded by a same wavelength of the recording-/reproducing light beam is sampled.

DESCRIPTION OF THE PREFERRED EMBODIMENTS

The embodiments of the present invention will now be described with reference to the accompanying drawings.

Figure 2:
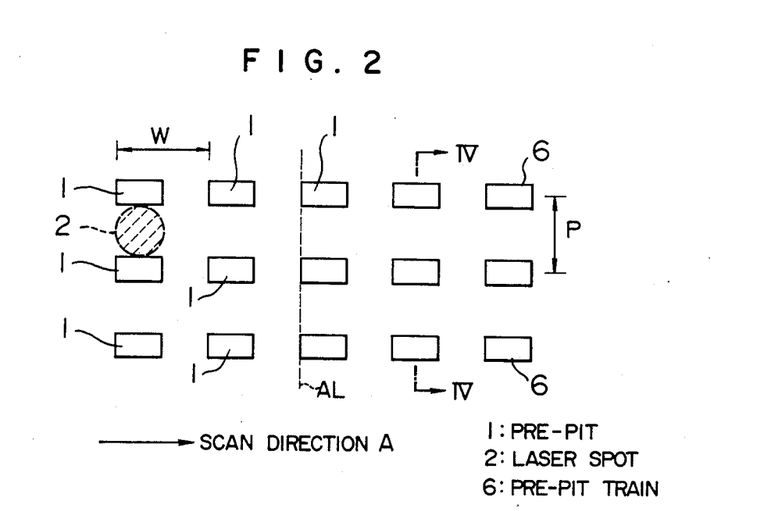
FIG. 2 is a partial plan view showing the information recording medium according to an embodiment of the present invention.

FIG. 2 is a partial plan view of the digital information recording medium according to a first embodiment of the present invention, wherein reference numeral 1 represents a pre-pit and reference numeral 2 represents a light beam spot.

In the figure, a plurality of pre-pit trains are disposed on a recording film 8 in the scan direction A at intervals of pitch P, each pre-pit train comprising a plurality of concavity or convexity shaped pre-pits 1 disposed at intervals of W. The pre-pit train serves not only as a guide track for the recording/reproducing laser beam spot 2, but also as phase pits for detecting synchro signals during a multiple light-wavelength recording or reproducing to be described later. The beam spot 2 is scanned between pre-pit trains for recording and reproducing. The pitch P between pre-pit trains is set such that the beam spot 2 scans two pre-pits 1 on opposite sides at the same time if only a correct tracking is carried out. For recording and reproducing digital information signals between pre-pit trains, pre-pits 1 of adjacent pre-pit trains are disposed such that at least one of the edges of each pre-pit is aligned on a straight line AL perpendicular to the pre-pit train.

Instead of forming information bits between pre-pit trains, a recording track for information signals may be formed superposing upon a pre-pit train (i.e., information bits are formed superposing on pre-pits). In this case, the above requirement for pre-pit edge alignment is not always necessary.

Figure 3:
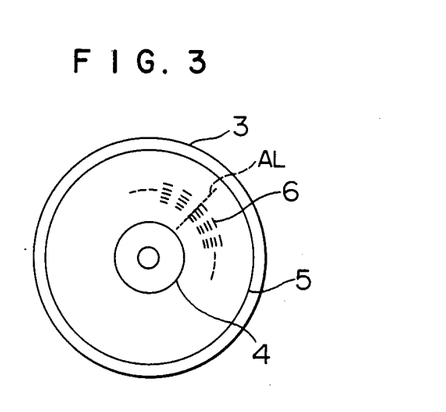
FIG. 3 is a plan view showing a disc type recording medium of the embodiment.

In case of a disc type information recording medium, pre-pit trains 6 are formed spirally or concentrically between the inner circle 4 and the oute circle 5 of the recording area of the disc type information recording medium 3, as shown in FIG. 3. In forming a recording track for information signals between pre-pit trains, one of the edges of each pre-pit is aligned on a straight line AL in the radial direction of the information recording medium, according to the requirement of the above case.

Figure 4:
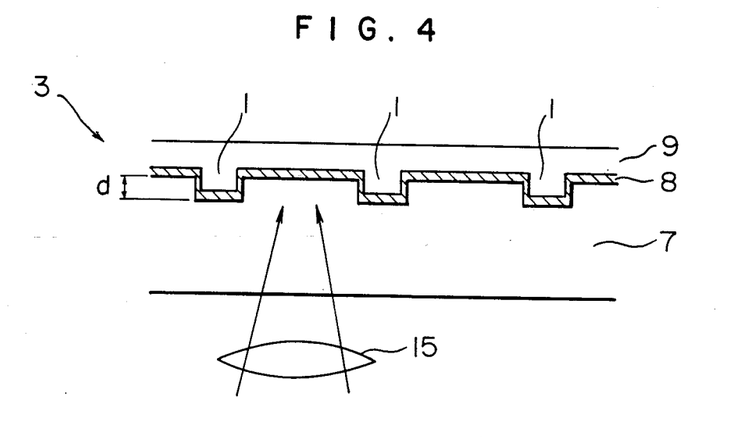
FIG. 4 is a cross section along line IV—IV of FIG. 2.

FIG. 4 is a cross section alpng one-dot-chain line IV—IV of FIG. 2, wherein reference numeral 7 represents a transparent substrate, 8 a recording film, and 9 a passivation film.

Referring to FIG. 4, a concavity serving as a pre-pit 1 is formed on the transparent substrate 7 on which the recording film 8 and the passivation film 9 are deposited.

The transparent substrate 7 is made of glass or acrylic resin, polycarbonate resin or the like using a conventional manufacturing method. At the manufacturing process of the transparent substrate 7, a series of concavities are formed on its surface to make pre-pit trains. The recording film 8 is made of a material which can undergo a multiple light-waveform recording, such as phtalocyanine ($H_2PC$) dispersed polymethyl methacrylate (PMMA), Lif:Mg, NaF and the like. The recording film 8 is made in the form of a thin film using a sputtering, evaporation or plasma polymerization method. On the recording film 8, the passivation film 9 is deposited which is made of $SiO_2$, $Al_2O_3$ or photo-polymer.

Figure 5:
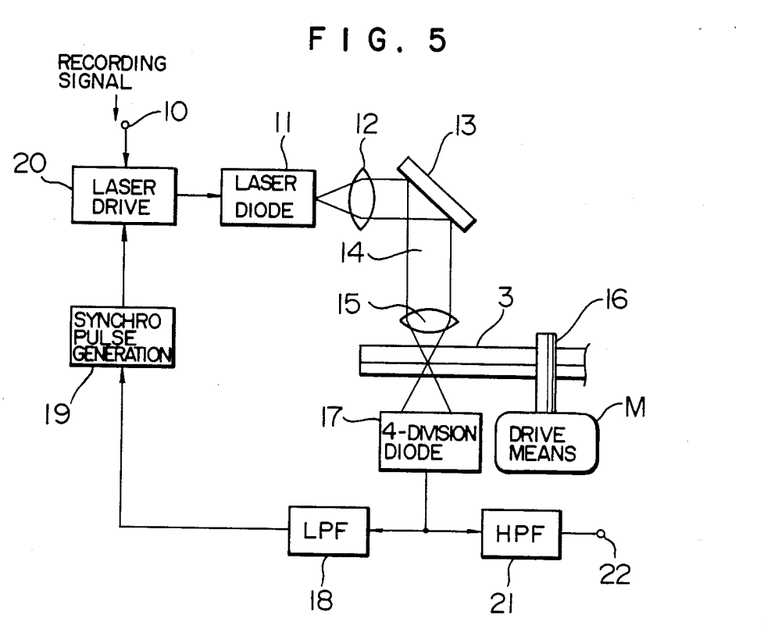
FIG. 5 schematically shows the construction of the recording and reproducing apparatus of the present invention.

FIG. 5 shows the structure of the recording and reproducing apparatus according to the embodiment of the present invention. The apparatus includes an input terminal 10, a laser diode 11 to be described later, a lens 12, a reflecting mirror 13, a laser beam 14, a lens 15, a rotary shaft 16, a 4-division photodiode 17, a low-pass filter 18, a synchro pulse generator 19, a laser drive circuit 20, a high-pass filter 21, and a reproduced signal output terminal 22.

In FIG. 5, the information recording medium 3 for recording and reproducing digital information is assumed here of a disc shape. The information recording medium 3 has the construction as described with FIGS. 2 to 4. During recording and reproducing, the medium 3 is mounted on the rotary shaft 16 and rotated at a predetermined speed by a drive unit M.

The laser diode 11 varies the wavelength of a laser beam 14 to be outputted therefrom. The outputted laser beam 14 is transformed into a parallel beam by the lens 12 and reflected by the reflecting mirror 13. Thereafter, the beam is focussed by the lens 15 on the recording film 8 of the information recording medium 3.

The transparent substrate 7 and the passivation film 9 shown in FIG. 4 have a nature of light transparency and the recording film 8 transmits a part of radiated light. Therefore, the laser beam 14 (FIG. 5) passing through the lens 15 (FIG. 5) is radiated from the transparent substrate 7 side and focussed on the film 8 to form a laser spot 2 as of FIG. 2.

As described with FIGS. 2 and 4, pre-pit trains made of pre-pits 1 are formed on the information recording medium 3. Assume that the refractive index of the transparent substrate is N, and that the depth d of a pre-pit 1 is set ¼N times of the wavelength λ of a laser beam 14. The phases of the laser beam 14 component passing through a pre-pit 1 and the component not passing a pre-pit 1 have an inverted relation to each other so that the components interfere with each other to reduce the intensity of the laser beam.

Reverting back to FIG. 5, the laser beam 14 passing through the information recording madium 3 is received by the 4-division photodiode 17. Because of interference caused by the pre-pit 1, the image of the beam spot 2 as of FIG. 2 on the recording film 8 (FIG. 4) is produced on the 4-division photodiode 17. The outputs of respective detecting elements of the 4-division photodiode 17 decrease in amplitude when the beam spot 2 is radiated on the pre-pits 1, depending on the relative position of the beam spot 2 and the pre-pit trains. Therefore, the relation between the amplitudes obtained from these elements enables detecting the position of the beam spot 2, i.e., detecting the tracking state, so that tracking control over the beam spot 2 can be made in accordance with the detection outputs from the elements. A small cross-talk between tracks and fine tracking error signals were obtained under conditions of about 1 micron of the beam spot 2 diameter, 0.6 micron of the pre-pit width 1, and 1.6 micron of the pitch P between pre-pit trains.

The output signals from the respective detecting elements of the 4-division photodiode 17 are added and supplied to the low-pass filter 18 and the high-pass filter 21. A pulse signal representative of a pre-pit 1 is derived from the low-pass filter 18 and supplied to the synchro pulse generator 19 which in turn generates a synchro pulse at the leading edge of the pulse signal from the low-pass filter 18. The synchro pulse is supplied to the laser drive circuit 20 which in syncro therewith varies the wavelength of the laser beam 14 from the laser diode 11. In this manner, a multiple light-wavelength recording and reproducing is performed.

To focus the laser beam 14 on the information recording medium 3, a conventional astigmatism method may be used.

Figure 6:
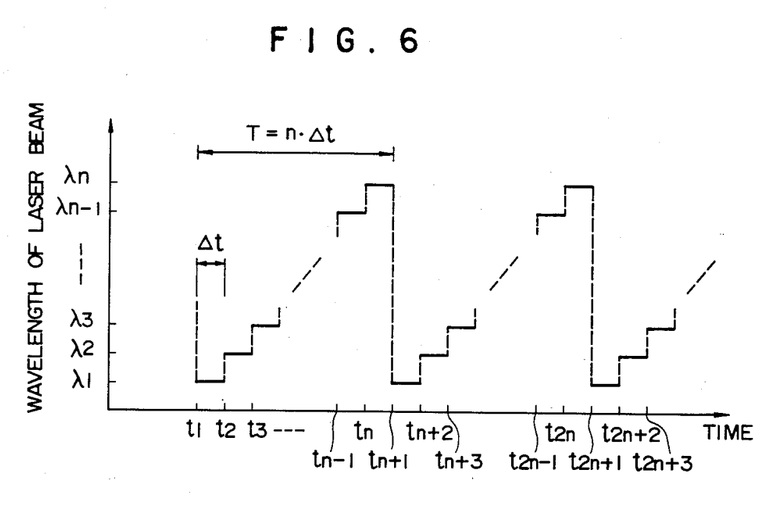
FIG. 6 is a graph showing that the wavelength of a light beam shown in FIG. 5 varies preset times in the preset order.

As described above in connection with FIG. 1, since the recording film 8 is made of a material which undergoes a multiple light-wavelength recording using the PHB phenomenon, the absorption power corresponding to a specific wavelength varies with the intensity of the laser beam 14 whose wavelength is varied during recording (FIG. 6). The intensity of the laser beam 14 is modulated by a recording signal supplied from the input terminal 10 to vary the absorption power of a specific absorption band WT in accordance with the recording signal. In this manner, recording signals in the form of information bit trains are recorded on the recording film 8 between pre-pit trains.

Figure 7:
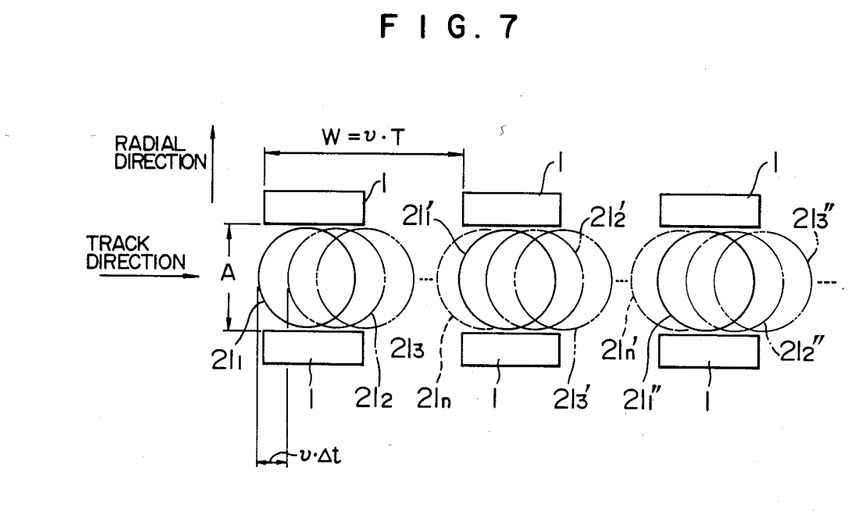
FIG. 7 illustrates mutual positions of a plurality of information bits formed on the recording medium of FIG. 2 using the apparatus of FIG. 5.

Next, referring to FIGS. 5 to 7, the operation of the multiple light-wavelength recording and reproducing will further be described in detail.

Assuming here that n optical holes lowering the absorption power can be recorded as shown in FIG. 1(C) over the width $\Delta\omega_i$ of the light absorption spectral curve of the recording medium 3. In this case, as the laser beam 2 moves by one interval W between pre-pits (FIG. 2), the wavelength of the laser beam 14 is sequentially varied n times. These wavelengths correspond to the respective optical holes.

In particular, in FIG. 6 it is assumed that the wavelengths for respective holes are represented by $\lambda_1$, $\lambda_2$, $\lambda_3$, ..., $\lambda_{n-1}$ and $\lambda_n$, the time necessary for scanning the laser beam by one interval W between pre-pits 1 is represented by T, and the time instants when the laser drive circuit 20 receives synchro pulses from the synchro pulse detecting circuit 19 are represented by $t_1$, $t_{n+1}$, $t_{2n+1}$, .... Then, the wavelength of the laser beam 14 is set at $\lambda_1$ during a period $\Delta t = (T/n)$ from time $t_1$ to $t_2$, $\lambda_2$ during the period $\Delta t$ from time $t_2$ to time $t_3$, $\lambda_3$ during the period $\Delta t$ from tim $t_3$ to time $t_4$, ..., $\lambda_{n-1}$ during the period $\Delta t$ from time $t_{n-1}$ to time $t_n$, and $\lambda_n$ during the period $\Delta t$ from time $t_n$ to time $t_{n+1}$. At time $t_{n+1}$, the wavelength of the laser beam 14 is again set at $\lambda_1$ during the period $\Delta t$ from time $t_{n+1}$ to time $t_{n+2}$. Similarly, the wavelength of the laser beam 14 is sequentially switched to $\lambda_2$, $\lambda_3$, ... every time the period $\Delta t$ lapses. Thus, after each time duration T during which the laser beam 14 is moved by one interval W between pre-pits 1, the switching of the wavelengths $\lambda_1$, $\lambda_2$, $\lambda_3$, ..., $\lambda_{n-1}$ of the laser beam 14 is carried out and repeated.

With such switching of the wavelength of the laser beam 14, information bits as shown in FIG. 7 are recorded on the recording film 8. Particularly, at the scan speed v of the laser beam 14 (which speed corresponds to the speed of movement of the portion of the information recording medium on which the laser beam 14 is radiated), information bits 21 are recorded corresponding to the wavelengths $\lambda_1, \lambda_2, \lambda_3, \ldots \lambda_{n-1}$ and $\lambda_n$ of the laser beams 14, between one interval of pre-pits and during time duration T while the laser beam 14 is scanned. In this case, the information bits 21 recorded time sequentially by the laser beams of a different wavelength are superposed each other. However, information bits 21 recorded by the laser beam of a same wavelength are arranged not to superpose each other.

In FIG. 7, information bit $21_1$ is recorded by the laser beam having wavelength $\lambda_1$, information bit $21_2$ is recorded by the laser beam having wavelength $\lambda_2, \ldots,$ and information bit $21_n$ is recorded by the laser beam 14 having wavelength $\lambda_n$. Information bits between each interval W are represented with or without appostrophe added after respective reference numerals. The information bits with a same suffix are formed by the laser beam having a same wavelength. It is seen from FIG. 7 that the information bits $21_1, 21_2, \ldots$ are recorded superposing each other, however, the information bits (e.g., information bits $21_1, 21_1', 21_1''$) recorded by the laser beam 14 having a same wavelength are not superposed each other.

Each information bit 21 recorded between one interval W between pre-pits 1 is sequentially formed and displaced by $v \cdot \Delta t$. In this case, since the information bits $21_1, 21_1',$ and $21_1''$ by the laser beam 14 of wavelength $\lambda_1$ are recorded in synchro with detection of the pre-pits 1, the interval between pre-pits 1 must be longer than the length of an information bit in the direction of a track and also the distance $v \cdot \Delta t$ must suffice the relation $v \cdot \Delta t \leq$, W/n in order not to superpose the information bits recorded by a same wavelength laser beam.

The multiple light-wavelength recording is carried out in the above way.

In reproducing, a recording signal is not supplied from the input terminal 10, but a laser beam 14 is used whose intensity is constant and smaller than that during recording. Similarly to the case of recording, the wavelength of the laser beam 14 varies in synchro with a synchro pulse outputted from the synchro pulse generator 19. Thus, a laser beam spot 2 formed by a same wavelength as in recording is radiated on each information bit on the information recording medium 3 to sequentially read the information content of the information bits $21_1, 21_2, \ldots$, recorded time sequentially which in turn is outputted as correct information signals from the output terminal 22 via the high-pass filter 21.

As understood from the foregoing description, one or more information bits are recorded between the information bits formed by a same wavelength laser beam. Recording information bits without superposing each other is the same as in the prior art. However, as in the above embodiment wherein one or more information bits can be recorded between the information bits formed by a same wavelength laser beam, the information bits can be further sampled and recorded during a sampling period during which digital information signals has been sampled heretofore according to the prior art. Further, correct reproducing these sampled contents is possible. As a result, the recording density is improved and hence the transfer rate becomes high. Assuming that the number n (integer more than 2) of information bits per one interval W of pre-pits, the transfer rate according to the present embodiment becomes n times higher than the conventional one.

In case where a recording track for information signals is formed between pre-pit trains, the pre-pits are disposed in the manner, as already described, that at least one of the edges of each pre-pit is aligned on the straight line AL perpendicular to the pre-pit train. Therefore, even if switching control of the laser beam wavelength during recording and reproducing is conducted at the pre-pit reproducing timing basing on any one of the two adjacent pre-pit trains, it is possible to precisely read the information content using a correct wavelength laser beam.

Figure 8:
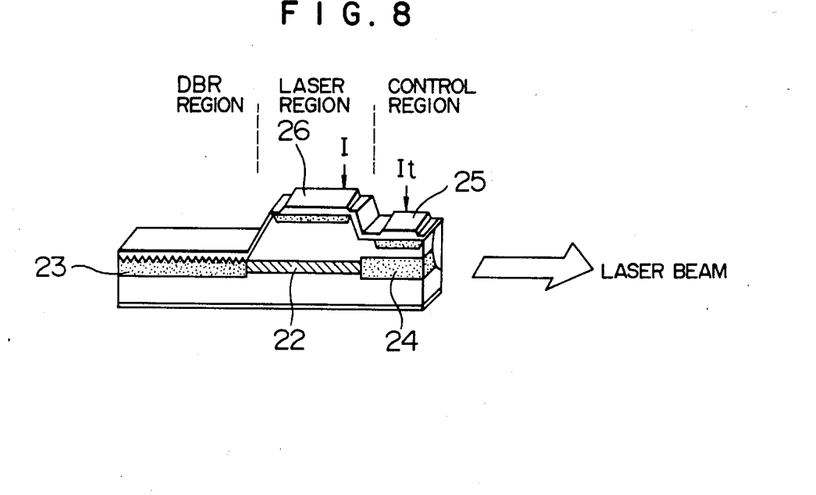
FIG. 8 shows a specific example of the laser diode shown in FIG. 5.

The laser diode 11 of FIG. 5 is of the type that can scan a laser beam while varying the wavelength at high speed. An example of such laser diode is shown in FIG. 8. The laser diode shown in FIG. 8 is a GaAlAs/Inp integrated laser using a distributed Bragg reflector (DBR) and is constructed of a DBR region, a laser region and a wavelength control region. The effective resonance length to be determined by a DBR guide 23 and an external guide 24 respectively mounted on opposite sides of an active layer 22 varies with current I supplied to an electrode 25 to thereby vary the wavelength of the laser beam 14.

The intensity of the laser beam 14 varies with current I supplied to an electrode 26 formed on the laser region, irrespective of its wavelength. The laser diode of this type is disclosed in the following document: "Wavelength Tuning of Ga-In-As-P/In-P Integrated Laser with Butt-jointed Built-in Distributed Bragg Reflector" by YUICHI TOHMORI et al, 4-th International Conference on Integrated Optics and Optical Fiber Communication Technical Digest, IOOC, 1983 June.

Figure 9:
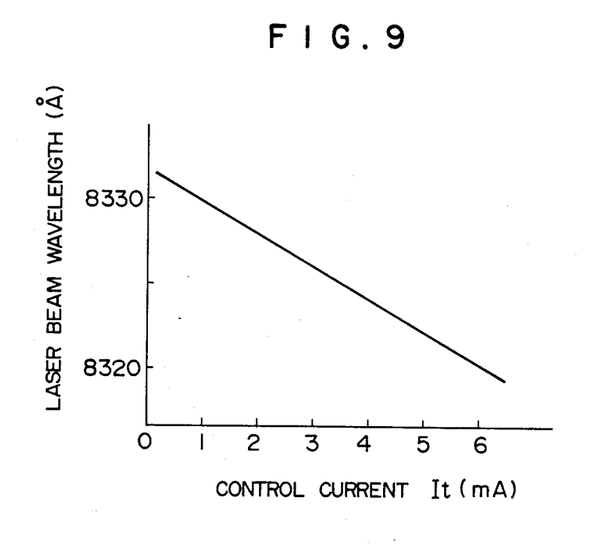
FIG. 9 shows the relationship between the control current and the wavelength of the laser diode.

FIG. 9 shows an example of a characteristic curve showing a change in wavelength of the laser diode of FIG. 8. As apparent from FIG. 9, if the current It passing through the electrode 25 (FIG. 8) is changed in the range of 1 to 6 mA, then the wavelength of the laser beam 14 varies about 10A.

Figure 10:
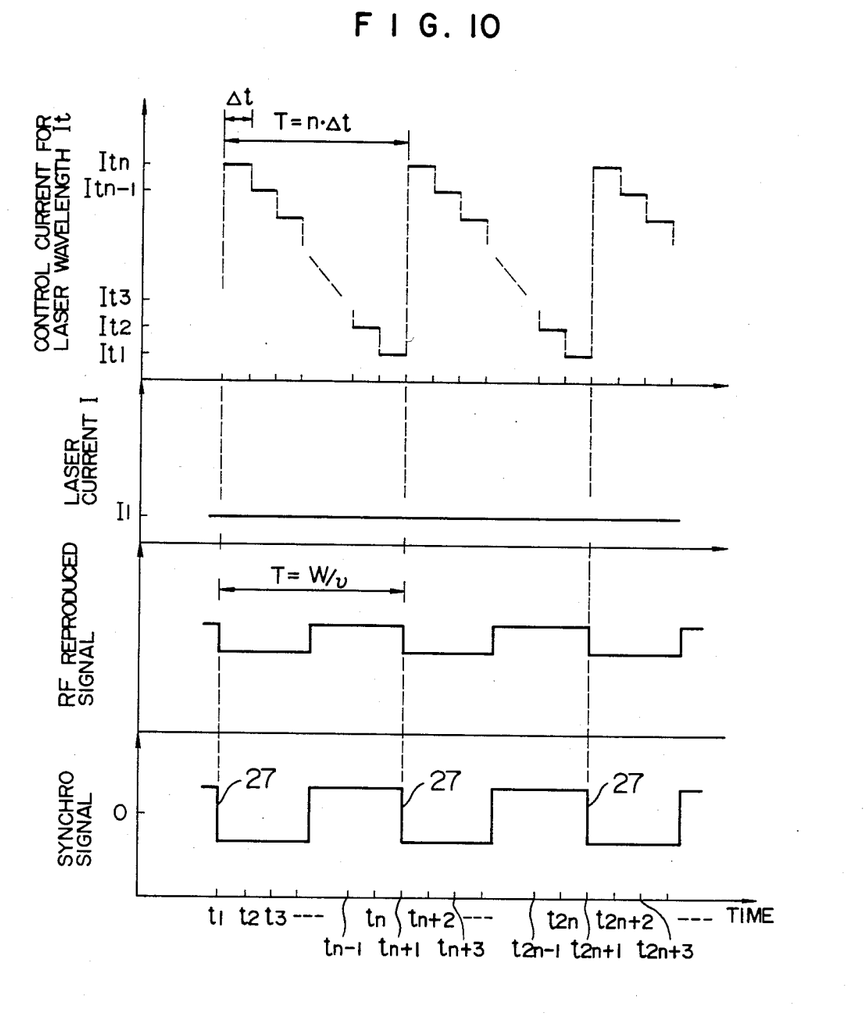
FIG. 10 shows waveforms of signals at various points of the apparatus of FIG. 5 during reproducing.

To vary the wavelength of the laser beam 14 as shown in FIG. 6 wherein $\lambda_1 < \lambda_2 < \lambda_3 \ldots < \lambda_{n-1} < \lambda_n$ is assumed, current It is supplied from the laser drive circuit 20 (FIG. 5) to the electrode 25 of the control region shown in FIG. 8 and stepwise reduced at each period $\Delta t$ as shown in FIG. 10, which is repeated at a period T ($=n \cdot \Delta y$). In reproducing, current I to be supplied to the electrode 26 of the laser region shown in FIG. 8 is maintained at a constant value $I_1$ which generates a laser beam 14 of a constant intensity sufficient for preventing the PHB phenomenon when radiated on the recording film.

When the laser beam 14 thus set is radiated on the digital information recording medium 3 rotating at a line speed v as shown in FIG. 5, an RF signal modulated by T=W/v due to grating of a part of the laser beam 14 by the pre-pit trains is obtained from the 4-division photodiode 17, as shown in FIG. 10. If there are information signals recorded on the information recording medium 3, the 4-division photodiode 17 also obtains information signals n time as high as the frequency of detecting the RF signal. These RF signal and information signals are separated by the low-pass filter 18 and the high-pass filter 21, a synchro signal representative of a pre-pit 1 being obtained from the low-pass filter 18 as shown in FIG. 10. Upon detection of the leading edge 27 of the synchro signal, the synchro pulse generator 19 generates a synchro pulse for starting scanning the laser beam 11 of a different wavelength.

Figure 11:
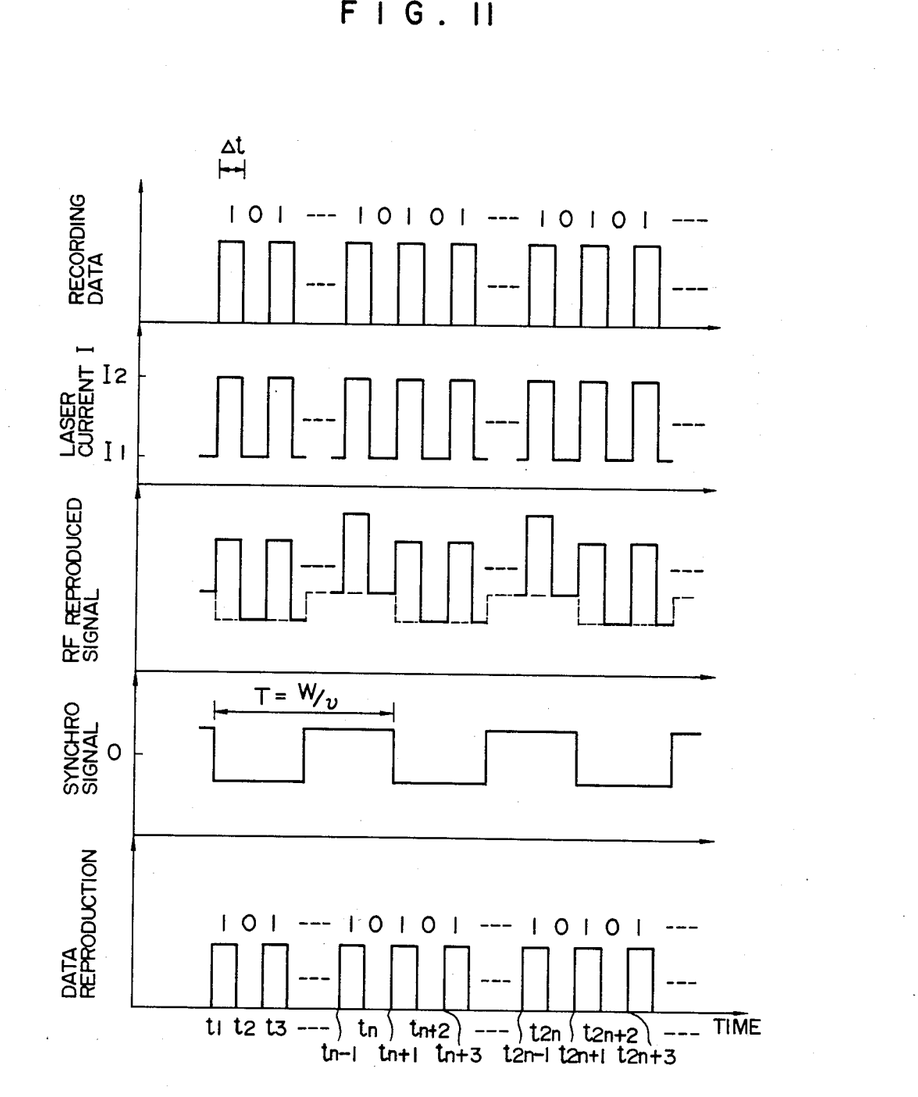
FIG. 11 shows similar waveforms during recording.

While the laser diode 11 is scanned and its wavelength is varied to record information signals, current I to be supplied to the electrode 26 (FIG. 8) of the laser region of the laser diode 11 is modulated as shown in FIG. 11 between $I_2$ necessary for recording and $I_1$ necessary for reproducing for each recording data of the information signals of FIG. 11. Similarly to the case of reproducing, the 4-division photodiode 17 outputs an RF signal as well as information signals superposed thereon. From the reproduced RF signal, the low-pass filter 18 and the high-pass filter 21 produce a synchro signal and a reproduced data which is the same as the recorded data. The produced synchro signal is used for scanning the laser diode 11 and varying its wavelength.

As seen from the above, the laser diode 11 starts scanning and changing its wavelength in both recording and reproducing based on the reproduced timing from a pre-pit. Therefore, information signals are efficiently reproduced during reproducing without lowering the output amplitude.

On the contrary, if a tracking guide groove is recorded continuously and information bits are formed time sequentially by the laser beam whose wavelength is sequentially varied, it is not possible to discriminate, based on a reproduced signal of the guide groove, what wavelength of the laser beam was used for recording an information bit. Consequently, reproducing information signals is impossible.

The advantageous effect of the above embodiment will be described quantitatively.

It is assumed now that the outer diameter of a disc type information recording medium is 120 mm, the diameter of the recording area is 50 to 110 mm, the track pitch is 1.6 micron, the number of revolution is 400 rpm, the wavelength range of the laser beam is 8320 to 8330 Å, the diameter of a beam spot is 1 micron, and the interval of the wavelength within the wavelength range is 2 Å. With this 2 Å interval, five information bits can be recorded by different wavelength beam spots partially Superposing each other between one interval W between the information bits formed by a same wavelength beam spot. That is, a 5-division multiple light-wavelength recording and reproducing is possible.

The interval W between the information bits recorded by a same wavelength beam spot is set at a minimum value (i.e., 1 micron equal to the information bit diameter at the innermost track) which avoids superposition of information bits. Then, the number N of information bits formed on one track by a same wavelength beam spot is:

$$50\pi(mm)/1 \text{ (micron)} = 50\pi \times 10^3$$

Since the scan time per one track is 60/400 sec, the transfer rate of the above embodiment becomes:

$$50\pi \times 10^3 \times 5/(60/400) \approx 5 \text{ (M bits/sec)}$$

Further, since the number of tracks within the recording area is 30 (mm)/1.6 (micron), the storage capacity of the information recording medium becomes:

$$5 \text{ (M bits)} \times (60/400) \times (30 \text{ (mm)}/1.6 \text{ (micron)}) \times \tfrac{1}{8}$$
$$\text{(bits)} \approx 1800 \text{ (M bytes)}$$

In the above example, the dimensions in FIGS. 6 and 7 take $\Delta t = 0.2 \, \mu sec$, $T = 5 \times 0.2 = 1 \, \mu sec$, the scan speed at the innermost track $v = 103$ mm/sec, $W = vT = 1$ micron, the pre-pit length at the innermost track $= W/2 = 0.5$ micron.

On the contrary, with the same conditions, the maximum transfer rate according to the prior art without incorporating the multiple light-wavelength recording becomes: considering that the maximum number of information bits per one track is $50\pi \times 10^3$ and the scan time per one track is 60/400 sec as described above, $$50\pi \times 10^3 \times 60/400 \approx 1 \text{ (M bits/sec)}$$

Thus, the above embodiment can attain the transfer rate five times as high as the above conventional one. This is also true for the case wherein the PHB phenomenon is utilized and a multiple recording is accomplished by changing the wavelength of a laser beam every time the entire recording area is scanned, so that the above embodiment can also attain the transfer rate five times as high as such multiple recording.

Figure 12:
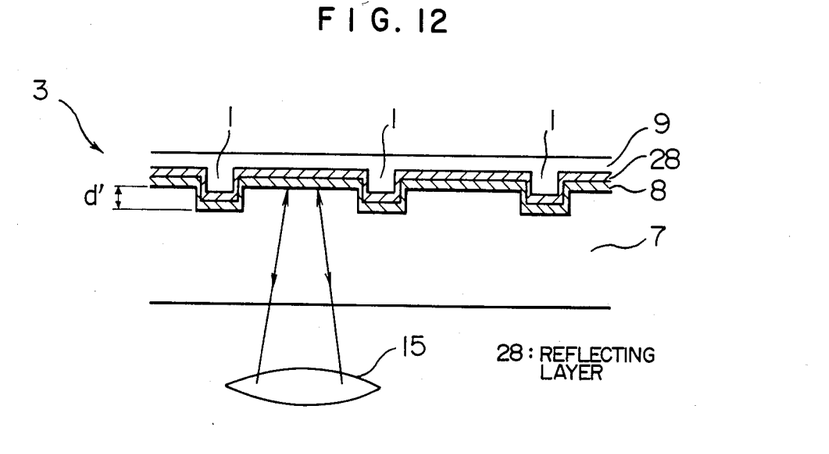
FIG. 12 is a partial cross section of the information recording medium according to another embodiment of the present invention.

FIG. 12 is a partial cross section showing the digital information recording medium according to another embodiment of the present invention. Reference numeral 28 represents a reflecting layer. The elements corresponding to those in FIG. 4 are represented by identical reference numerals and the reiterating description therefor is omitted.

The previous embodiment uses a transmission type information recording medium, while this embodiment shown in FIG. 12 uses a reflection type medium with the reflecting layer 28 laid on the recording film 8. Similar to the embodiment shown in FIG. 2, this embodiment is also provided with a guide track made of a train of pre-pits 1 of a concavity shape. The information recording medium is constructed such that on the transparent substrate 7, the recording film made of such as phtalocyanine ($H_2PC$)/polymethyl methacrylate (PMMA) is deposited on which recording film the reflecting layer 28 of metal thin film such as Au, Ag, Al, Ni or Ti is deposited through evaporation. Further, the passivation layer 9 is formed on the reflecting layer 28.

In this embodiment, the reflectivity of an information bit formed on the recording film 8 apparently increases due to the reflecting layer 28. Specifically, if the depth of the recording film 8 is properly set to place the two layers in an interference state, the reflectivity prior to recording is made low and the reflectivity after recording is made high so that a high reproduced output can be obtained. In this embodiment, the depth d' of the pre-pit 1 is made $\lambda/8$ wherein $\lambda$ is the wavelength of a laser beam and N is the refractive index of the transparent substrate 7 to thereby obtain a trucking error signal similarly to the first embodiment.

Figure 13:
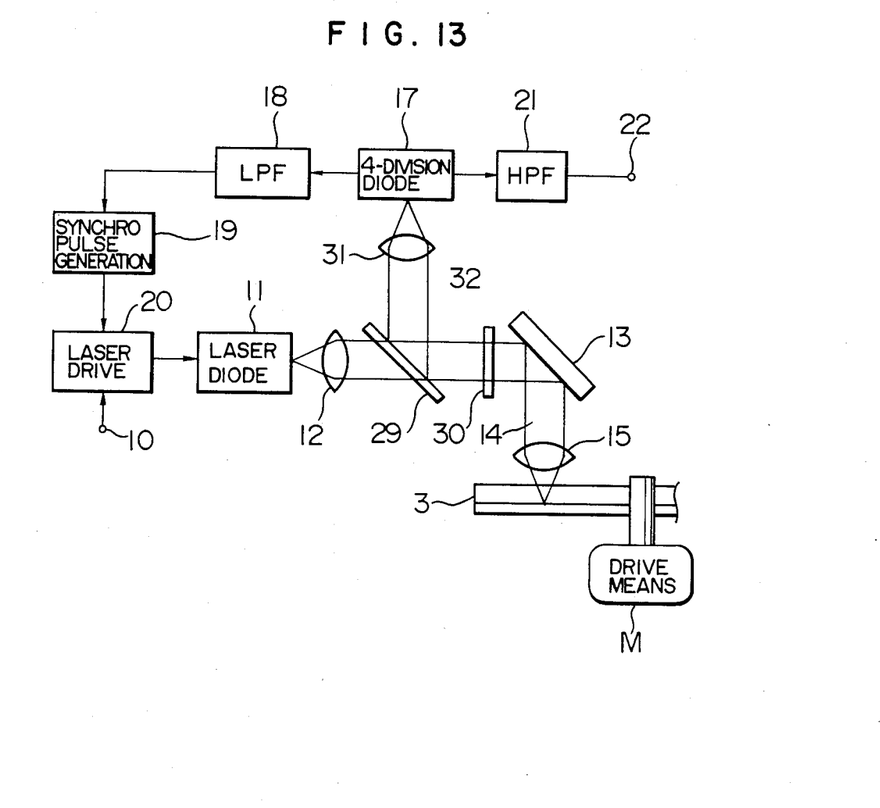
FIG. 13 shows the construction of the recording and reproducing apparatus according to another embodiment of the present invention.

FIG. 13 shows the construction of the recording and reproducing apparatus using the reflection type information recording medium according to another embodiment of the present invention, wherein reference numeral 29 represents a polarizing prism, 30 a quarter wavelength plate, and 31 a lens. The elements corresponding to those in FIG. 4 are represented by identical numerals.

Similar to a conventional recording and reproducing apparatus using a reflection type information recording medium, there are provided the polarizing prism 29 and the quarter plate 30 in the optical path between the lens 12 and the lens 15, so that the optical paths for the lsser beam 14 to be radiated to the information recording medium 3 and the laser beam 32 reflected from the medium 3 are separated leaving a part of the paths in common. The separated laser beam 32 is received via the lens 31 by the 4-division photodiode. The structure of other elements and their operation as well as the advantageous effect are similar to the embodiment shown in FIG. 4.

In recording and reproducing information signals by using the apparatus of FIG. 13 and the medium of FIG.

12, the recording capacity may be doubled if another medium of the same construction is attached on the protective layer 9 side of FIG. 12.

In the embodiments described above, in order to erase recorded information signals, a light having a wavelength which does not generate the PHB phenomenon is radiated on the portion of the recording film where the signals desired to be erased are located. If the entire erase is desired, the entire recording film may be heated. After such erase, holes as shown in FIG. 1(C) on the recording film will naturally disappear so that a light absorption characteristic as shown in FIG. 1(A) is resumed.

It is obvious that the information recording medium may be not only of a disc type but also of a plate type which is used for recording and reproducing by two-dimensionally scanning a laser beam.

As described so far, according to the present invention, a plurality of information bits are time sequentially formed between the two information bits formed by a same wavelength light beam. The contents of the plurality of information bits can correctly be reproduced in the same order as in recording. Thus, it is very advantageous in that the recording density and the transfer rate can be improved.

What is claimed is:

1. A digital information recording and reproducing method comprising the steps of:
   forming a plurality of light beam guide tracks on a recording medium capable of multiple light-wavelength recording, said tracks being spaced apart by a predetermined pitch and each of said tracks comprising a series of pre-pits disposed in a scan direction and spaced apart by an interval longer than the diameter of a spot of a light beam for use in recording and reproducing; and
   recording and reproducing an information bit by changing said light beam to have a different wavelength predetermined n times in a predetermined order while said light beam is scanned by one interval of said pre-pits.

2. A method according to claim 1, wherein the timing of said wavelength change is set based on at least one interval of said pre-pits.

3. A method according to claim 1, wherein said recording medium includes a transparent substrate and a recording film formed on said transparent substrate.

4. A method according to claim 1, wherein said recording medium includes a transparent substrate, a recording film formed on said transparent substrate, and a reflecting layer formed on said recording film.

5. A digital information recording and reproducing apparatus comprising:
   a recording medium capable of multiple light-wavelength recording;
   a series of pre-pits formed on said recording medium, said series of pre-pits being disposed in a scan direction and spaced apart by an interval longer than the diameter of a spot of a light beam for use in recording and reproducing, and said series of pre-pits being disposed spaced apart by a predetermined pitch substantially perpendicular to said scan direction;
   laser drive means inputted with a digital recording information signal for driving a semiconductor laser;
   said semiconductor laser being responsive to the output from said laser drive means for recording a plurality of information bits, corresponding to a predetermined plurality of wavelengths, on said recording medium;
   drive means for driving said recording medium;
   light detecting means for detecting a light reflected or transmitted from said recording medium;
   means including a low-pass filter and a synchro pulse generator for deriving from the output of said light detecting means a synchro pulse signal to be applied to said laser drive means; and
   a high-pass filter for obtaining a reproduced signal from the output of said light detecting means;
   wherein said information bits respectively recorded in correspondence with said predetermined plurality of wavelength are disposed in a predetermined order within one interval of said pre-pits.

6. An apparatus according to claim 5, wherein in a plurality of pre-pit trains spaced apart by a pitch, at least one of edges of said pre-pit is aligned on a straight line substantially perpendicular to said scan direction.

* * * * *